United States Patent Office 2,936,478
Patented May 17, 1960

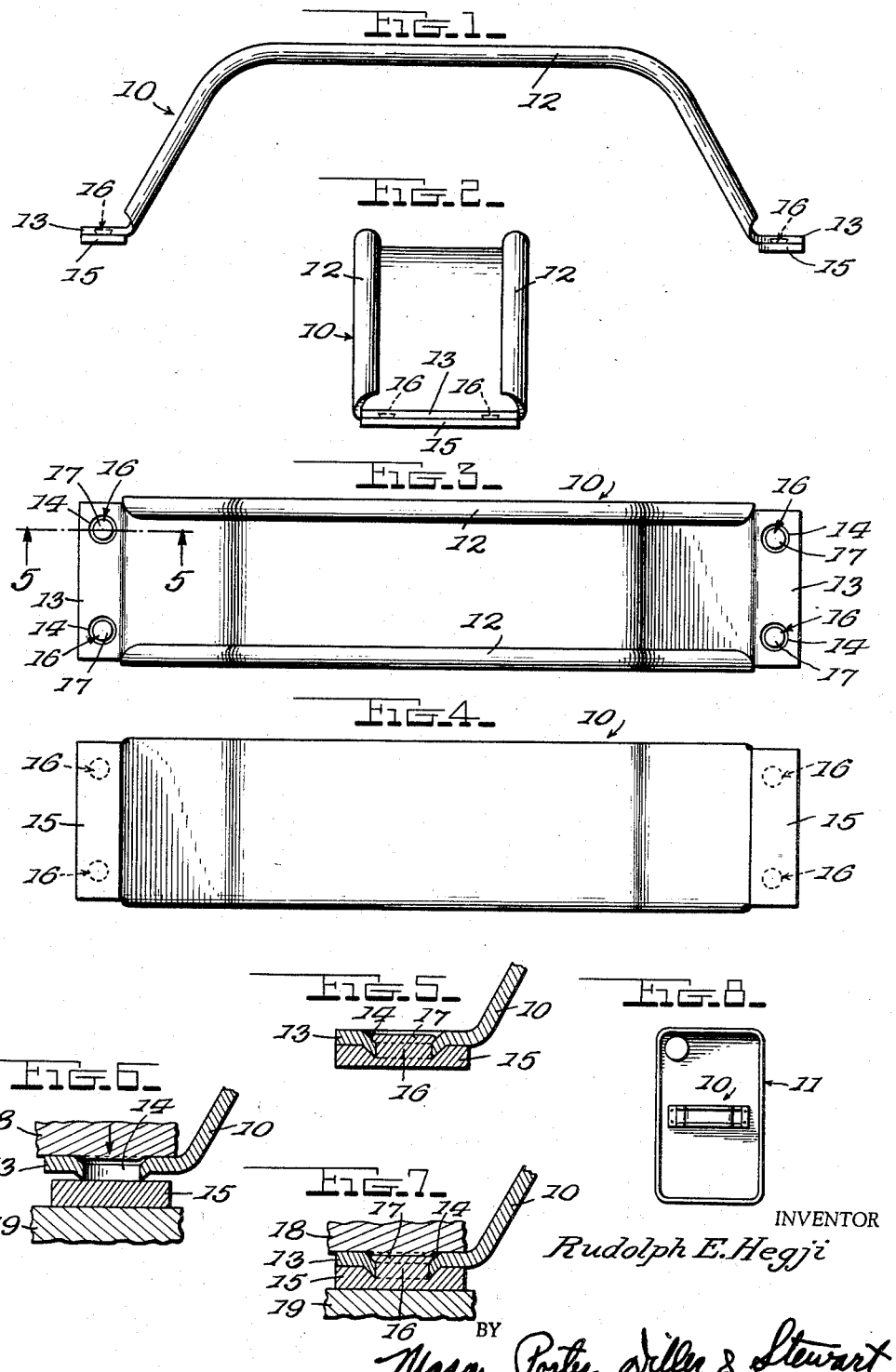

2,936,478

CAN AND HANDLE CONNECTING MEANS

Rudolph E. Hegji, Maywood, Ill., assignor to Continental Can Company, Inc., New York, N.Y., a corporation of New York Application January 7, 1957, Serial No. 632,821

1 Claim. (Cl. 16—125)

This invention relates generally to the manufacture of metal cans having carrying handles, and it relates specifically to the attachment of the handles to the cans.

The customary handles are of arched form with attaching feet at their ends, and these feet are soldered to the cans. Heretofore, the soldering operation has been rather expensive and none too rapid. The present invention, however, has aimed to provide for more economical and more rapid solder-bonding of the handles to the cans, and industrial use of the invention has proven that these aims have been fulfilled.

The principal object of the invention has been to improve upon conventional practice by providing the attaching feet of the handles with bodies of solder disposed at their lower sides and unitarily connected therewith, whereby soldering of the handles to the cans may be rapidly effected by placing the solder-carrying handles on the cans and applying heat to the handles and cans. The heating operation may well be performed while the cans are being progressively advanced by a conveyor.

Another object has been to provide for attaching the solder bodies to the handle feet in an extremely simple rapid and inexpensive manner.

A further object has been to connect the solder bodies with the handle feet by pressing said feet and bodies together with such force that cold flow of portions of the solder bodies occurs and is caused to interlock with portions of the feet.

A still further object has been to form the handle feet with apertures and to cause cold flow of stud-like portions of the solder bodies into interlocking engagement with the aperture walls when the feet and solder bodies are forcibly pressed together.

Another object has been to form countersunk openings in the handle feet to receive the stud-like portions of the solder bodies, and to upset these stud-like portions tightly in said countersunk openings.

With the above and other objects in view that will hereinafter appear, the nature of the invention will be more clearly understood by reference to the following detailed description, the appended claim and the several views illustrated in the accompanying drawing.

In the drawing:

Figure 1 of the accompanying drawing is a side elevation of a can handle having bodies of solder unitarily connected with its attaching feet in accordance with the invention.

Figure 2 is an end view.

Figure 3 is a top view.

Figure 4 is a bottom view.

Figure 5 is an enlarged detail sectional view on line 5—5 of Figure 3.

Figures 6 and 7 are fragmentary sectional views showing the manner of uniting the handle feet and the solder bodies by pressure.

Figure 8 is a plan view showing one of the handles attached to a can.

The specific embodiment of the invention disclosed in the drawing has proven to be advantageous from all standpoints and is therefore preferred. While this embodiment will be specifically described, it is to be understood that variations may well be made.

A suitably arched metal handle 10 is shown for attachment to a metal can of any type, for example to a rectangular can such as that shown at 11 in Figure 8. Such handles are customarily beaded longitudinally at 12 and are frequently longitudinally corrugated but for simplification of illustration no corrugations are shown.

The ends of the handle 10 are provided with flat attaching feet 13 to be soldered to the can, said feet being conventional except that they are formed with countersunk openings 14. Each foot preferably has two of these openings disposed near its ends. These openings are preferably formed by the same machine which stamps out the metal blanks from which the handles are to be formed. The stamping operation forms each foot with a downwardly deformed portion which provides the upper side of the foot with a shallow depression and provides the lower side of the foot with a corresponding downward projection, and the opening 14 extends from said shallow depression to the lower end of said projection.

Two flat bodies 15 of solder contact with the lower sides of the feet 13, respectively. These solder bodies 15 are provided with integral studs 16 projecting tightly into the countersunk openings 14, and the upper ends of said studs are upset at 17 in said openings, thereby unitarily connecting the solder bodies 15 with the feet 13.

In uniting each solder body 15 with the respective foot 13, said solder body and foot are pressed together (Figure 6) with such force that portions of the solder body are caused to cold flow into the openings 14 to form the studs 16, and portions of the same press which exerts the aforesaid pressure upset the studs as seen in Figure 7. These pressure-applying portions of the press are fragmentarily shown at 18 and 19 in Figures 6 and 7. During the pressing operation, the downward projections of the feet 13 form shallow recesses in the upper sides of the thin flat solder bodies 15 and become seated in these recesses.

The solder bodies are preferably cut successively from a solder ribbon carried by a spool mounted at the machine which shapes the metal blanks into handle form. The solder ribbon is automatically fed and cut to form the bodies 15 and properly locate these bodies against the feet 13; and simultaneously with blank shaping and ribbon cutting the machine exerts the required pressure to unite the solder bodies with the feet.

The handles 10 with their solder bodies 15 are placed on the cans, and said handles and cans are then heated sufficiently to melt the solder, thereby solder-bonding the handles to the cans. The handles may well be placed by hand on the cans and the latter then progressively fed by a conveyor through a burner flame which heats each can and its handle to sufficient temperature to effect the required solder-bonding. During handle application, after the solder bodies have been melted, the downward projections on the feet 13 serve to limit downward movement of the handles onto the cans and thus prevent an excessive amount of solder from being forced out between the feet 13 and the can top, assuring retention of sufficient solder to effectively secure the handle.

From the foregoing, it will be seen that novel and advantageous provision has been disclosed for attaining the desired ends. However, attention is again invited to the possibility of making variations within the scope of the invention.

I claim:

An arched can handle formed from sheet metal and having thin flat attaching feet at its ends, each of said thin flat feet having a perforation whose periphery is downwardly deformed to provide an integral lip on the under side of said foot about said perforation and a countersunk portion at the top of said perforation, and two thin flat solder bodies contacting with and substantially covering the lower sides of said thin flat feet respectively, each of said thin flat solder bodies having an integral stud which projects through said perforation of the attaching foot, each of said thin flat solder bodies also having a shallow recess in which said lip of each attaching foot is snugly seated, said lip being completely embedded in its respective solder body, the upper end of each stud being upset in said countersunk portion of the attaching foot, and providing a positive mechanical interlock between said attaching foot and its respective solder body, said lips engaging the can and serving to limit downward movement of the handle onto the can during fusion of said solder bodies when soldering the handle to a can, whereby an excessive amount of solder will not be forced out from between the feet and the can.

References Cited in the file of this patent

UNITED STATES PATENTS

| Number | Name | Date |
|---|---|---|
| 53,546 | White | Mar. 27, 1866 |
| 714,584 | Keiner | Nov. 25, 1902 |
| 1,022,380 | Prins | Apr. 2, 1912 |
| 1,574,790 | Carroll | Mar. 2, 1926 |
| 1,722,650 | Wagenhorst | July 30, 1929 |
| 2,263,166 | Darvie | Nov. 18, 1941 |
| 2,366,274 | Luth | Jan. 2, 1945 |